United States Patent
Kim et al.

(10) Patent No.: US 11,330,444 B2
(45) Date of Patent: May 10, 2022

(54) COGNITIVE RADIO COMMUNICATION CONTROL DEVICE FOR DETERMINING COGNITIVE RADIO TERMINAL AND COGNITIVE RADIO TERMINAL DETERMINING METHOD

(71) Applicant: INDUSTRY-ACADEMIC COOPERATION FOUNDATION, YONSEI UNIVERSITY, Seoul (KR)

(72) Inventors: Seong-Lyun Kim, Seoul (KR); Han Cha, Seoul (KR); Jee Min Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 139 days.

(21) Appl. No.: 16/970,126

(22) PCT Filed: Dec. 13, 2018

(86) PCT No.: PCT/KR2018/015884
§ 371 (c)(1),
(2) Date: Oct. 28, 2020

(87) PCT Pub. No.: WO2019/160229
PCT Pub. Date: Aug. 22, 2019

(65) Prior Publication Data
US 2021/0044985 A1 Feb. 11, 2021

(30) Foreign Application Priority Data
Feb. 14, 2018 (KR) .................. 10-2018-0018713

(51) Int. Cl.
*H04W 4/00* (2018.01)
*H04W 16/14* (2009.01)
(Continued)

(52) U.S. Cl.
CPC ........... *H04W 16/14* (2013.01); *H04W 24/02* (2013.01); *H04W 74/0833* (2013.01); *H04W 76/18* (2018.02)

(58) Field of Classification Search
CPC ..... H04W 16/14; H04W 76/18; H04W 24/02; H04W 74/0833
See application file for complete search history.

(56) References Cited

U.S. PATENT DOCUMENTS

| | | | | |
|---|---|---|---|---|
| 2012/0202538 A1* | 8/2012 | Uusitalo | ............ | H04B 17/3912 455/500 |
| 2012/0309444 A1* | 12/2012 | Wu | ........................ | H04W 16/14 455/517 |
| 2013/0016669 A1* | 1/2013 | Hottinen | ........... | H04W 74/0808 370/329 |

FOREIGN PATENT DOCUMENTS

| | | |
|---|---|---|
| JP | 2017-184228 A | 10/2017 |
| KR | 10-2015-0022874 A | 3/2015 |
| KR | 10-1806065 B1 | 12/2017 |

OTHER PUBLICATIONS

Kim, Jeemin et al. 'Opportunism in Dynamic Spectrum Access for 5G: A Concept and Its Application to Duplexing', arXiv:1801.06964v1, Jan. 22, 2018 Retrieved from (https://arxiv.org/abs/1801.06964) See pp. 2-5.

(Continued)

*Primary Examiner* — Erika A Washington (57) ABSTRACT

Disclosed is a control device for determining cognitive radio terminals. The device comprises: a spectrum sensing information storage unit for receiving and storing interference amount information for each frequency from spectrum sensing devices; a communication success probability calculation unit for receiving position information from secondary user terminals within a network and calculating a communication success probability of each secondary user terminal;

(Continued)

a reinforced learning unit for setting the communication success probability as an initial access probability for each of the secondary user terminals and enabling learning such that an access probability, a state function, and a utility function are updated for each of the secondary user terminals at each iteration; and a cognitive radio terminal determining unit for, when the leaning is completed in the reinforced learning unit, selecting a secondary user terminal to execute cognitive radio communication on the basis of a final access probability.

16 Claims, 4 Drawing Sheets

(51) Int. Cl.
    *H04W 76/18*     (2018.01)
    *H04W 24/02*     (2009.01)
    *H04W 74/08*     (2009.01)

(56) References Cited

OTHER PUBLICATIONS

Michelusi, Nicolo et al. 'Cognitive Access—Transmission Policies under a Primary ARQ process via Chain Decoding' arXiv: 1509.08018v1, Sep. 26, 2015 Retrieved from (https//arxiv.org/abs/1509.08018?context=cs) See pp. 1-43.

International Search Report; Written Opinion for PCT/KR2018/015884 dated Apr. 1, 2019.

\* cited by examiner

COGNITIVE RADIO COMMUNICATION CONTROL DEVICE FOR DETERMINING COGNITIVE RADIO TERMINAL AND COGNITIVE RADIO TERMINAL DETERMINING METHOD

CROSS-REFERENCE TO RELATED APPLICATIONS

This application is a National Stage Entry of PCT International Application No. PCT/KR2018/015884, which was filed on Dec. 13, 2018, and which claims priority from Korean Patent Application No. 10-2018-0018713 filed on Feb. 14, 2018. The disclosures of the above patent applications are incorporated herein by reference in their entirety.

BACKGROUND

1. Technical Field

The present invention relates to cognitive radio communication, more particularly to a cognitive radio communication control device for determining cognitive radio terminals and a cognitive radio terminal determining method.

2. Description of the Related Art

Cognitive radio communication refers to a communication method which, unlike conventional methods that occupy radio resources by using a single frequency band and a single protocol, detects and quickly adapts to the surrounding environment to intelligently avoid interference and occupy unused frequency spectrums and thereby maximize frequency use efficiency.

Although cognitive radio communication has not yet experienced active commercialization due to difficulties in detecting the surrounding environment, etc., there are various research efforts under way aimed at overcoming such difficulties.

In particular, it is anticipated that cognitive radio communication will be available for use for maximizing frequency use efficiency in a 5G environment where multiple IoT devices participate in communication.

In cognitive radio communication, a user that uses a frequency unhindered in a monopolistic manner may be defined as a primary user, and a user that uses a frequency band unused by the primary user in an opportunistic manner may be defined as a secondary user.

Existing research on cognitive radio communication mainly focused on methods for allowing the secondary user terminal to select an appropriate frequency. The IoT environment of the future is expected to include multiple IoT terminals participating competitively in cognitive radio communication, and in such cases, determining the terminals that are to perform cognitive radio communication can be a very complicated problem.

SUMMARY OF THE INVENTION

The present invention provides a device and a method for efficiently determining the terminals that are to perform cognitive radio communication in an environment where multiple IoT terminals participate in cognitive radio communication.

One aspect of the present invention provides a VNF transfer graph selection method, executed in an NFV MANO, for generating, maintaining, and deleting network services composed of VNF's in order to ensure the quality of an end-to-end network service. This method can include: obtaining a list of available VNF's for configuring the VNF transfer graph when an SLA including network QoS requirements is received, obtaining an inter-network delay value and an intra-network delay value from a virtualized infrastructure manager (VIM) when the VNF list is obtained, and selecting a VNF transfer graph that satisfies the network QoS requirements by using the inter-network delay value and intra-network delay value.

In one embodiment, the step of obtaining the inter-network delay value and the intra-network delay value from the virtualized infrastructure manager (VIM) when the VNF list is obtained can include: selecting at least one pair of adjacent VIM's based on a sliced SDN network, and requesting either one or both of the inter-network delay value and intra-network delay value from the selected VIM.

Here, the VIM that has received a request for the inter-network delay value can calculate the inter-network delay value by generating a temporary VM host and setting a temporary SDN flow rule to measure the roundtrip time for the counterpart VIM with which the pair is formed.

In one embodiment, the step of selecting the VNF transfer graph that satisfies the network QoS requirements by using the inter-network delay value and intra-network delay value can include: generating VNF transfer graphs that satisfy the network QoS requirements by using the inter-network delay value and intra-network delay value, and selecting one from the generated VNF transfer graphs by way of round-robin scheduling.

Another aspect of the present invention provides an NFV system that ensures the quality of an end-to-end network service. This NFV system can include an NFV MANO that obtains a list of available VNF's for configuring the VNF transfer graph when an SLA including network QoS requirements is received, obtains an inter-network delay value and an intra-network delay value by using the obtained VNF list, and selects a VNF transfer graph satisfying the network QoS requirements by using the obtained inter-network delay value and intra-network delay value; a VNFM that provides the VNF list to the NFV MANO; and a VIM that provides the inter-network delay value and intra-network delay value to the NFV MANO.

In one embodiment, the NFV MANO can select at least one pair of adjacent VIM's based on a sliced SDN network and request either one or both of the inter-network delay value and intra-network delay value from the selected VIM.

In one embodiment, the VIM can generate a temporary VM host and sett a temporary SDN flow rule to measure the roundtrip time for the counterpart VIM with which the pair is formed and thus calculate the inter-network delay value.

In one embodiment, the NFV MANO can generate VNF transfer graphs that satisfy the network QoS requirements by using the inter-network delay value and intra-network delay value and select one from the generated VNF transfer graphs by way of round-robin scheduling.

According to embodiments of the present invention, it is possible to efficiently determine, through learning, which terminals will perform cognitive radio communication in an environment in which multiple IoT terminals participate in cognitive radio communication.

DETAILED DESCRIPTION OF THE INVENTION

Other advantages and features of the present invention, as well as the methods for arriving at such, will become clearer from the embodiments described in detail herein taken together with the appended drawings. However, the present invention is not limited by the embodiments disclosed below and can be implemented in various different forms. The embodiments are provided merely for the purpose of more comprehensively disclosing the present invention and to enable a comprehensive understanding of the scope of the present invention for those of ordinary skill in the field of art to which the present invention pertains. The present invention is to be defined only by the scope of claims set forth below.

All terms used herein (including technical or scientific terms) have the same meanings as those generally accepted in the context of technology common in the field of art to which the present invention pertains. Terms defined in typical dictionaries can be interpreted as having the same meanings as those in related technology and/or in the present specification, and certain expressions that are not clearly defined herein should not be conceptualized or overly formalized in its interpretation. The terms used in the present specification are merely for describing the embodiments and are not intended to limit the present invention.

Figure 1:
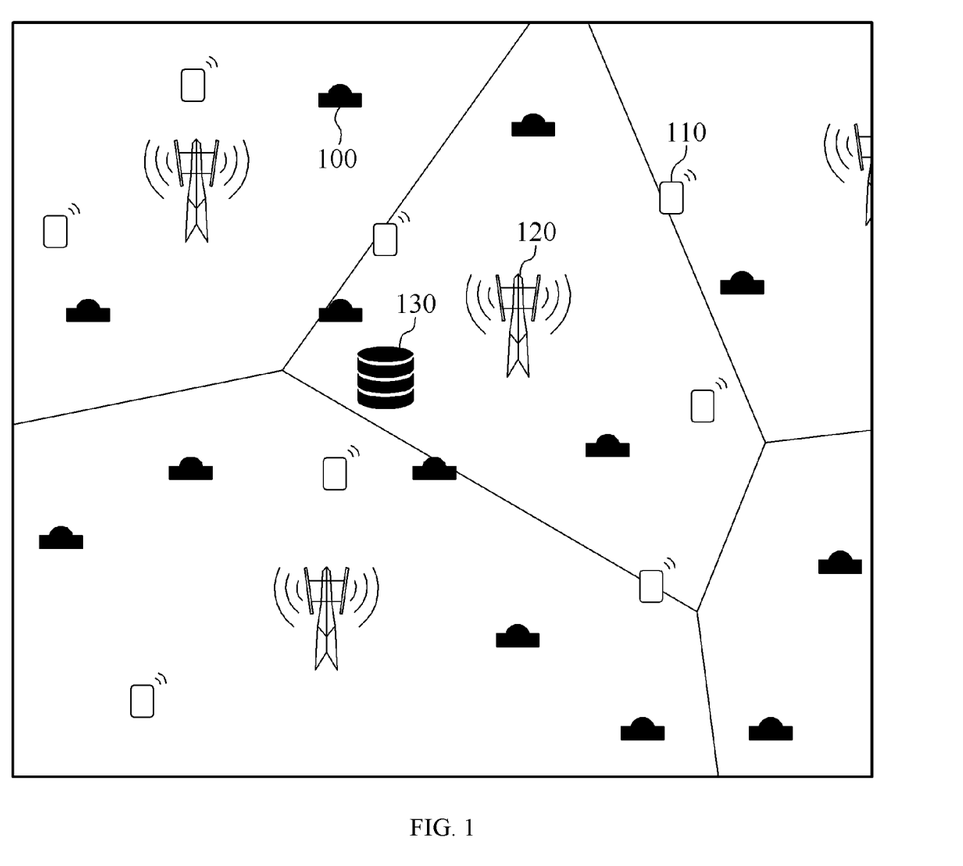
FIG. 1 illustrates the structure of a cognitive radio communication system to which the present invention may be applied.

FIG. 1 illustrates the structure of a cognitive radio communication system to which the present invention may be applied.

This embodiment is described using an example in which the secondary user terminals participating in cognitive radio communication according to an embodiment of the present invention include a multiple number of IoT terminals. However, it should be apparent to the skilled person that the terminal determining method for cognitive radio communication based on the present invention is not limited only to IoT terminals and can be applied to various types of terminals participating in cognitive radio communication.

In cognitive radio communication, terminals that are authorized to monopolistically use a particular frequency band are defined as primary user terminals, and terminals that do not have monopolistic authorization for the frequency band but use the frequency band opportunistically when it is unused by the primary user terminals are defined as secondary user terminals.

Referring to FIG. 1, a cognitive radio communication system to which the present invention may be applied may include multiple spectrum sensing devices 100, multiple secondary user terminals 110, multiple base stations 120, and a control device 130.

As described above, the multiple secondary user terminals 110 can be IoT terminals and may be activated to perform communication with receiver terminals when a particular event occurs. The secondary user terminals 110 may be distributed over multiple points and, if permitted by the control device 130 to perform cognitive radio communication, may perform communication by way of cognitive radio communication, but if not permitted, may wait for the next permission for cognitive radio communication or perform communication with the receiver terminals by way of a different communication method.

The control device 130 may serve to determine the terminals that are to perform cognitive radio communication from among the multiple number of secondary user terminals present in the network. According to a preferred embodiment of the present invention, the control device 130 may determine the terminals that will perform cognitive radio communication by learning. In order to determine the cognitive radio communication terminals, the control device 130 can perform a learning process for a particular duration of time and then determine the terminals that are to perform cognitive radio communication based on the results of the learning.

The multiple spectrum sensing devices 100 may be distributed over multiple points within the network, and each spectrum sensing device may provide the reception power (amount of interference) for each frequency to the control device 130.

The control device 130 may use the reception power (amount of interference) for each frequency obtained from the multiple spectrum sensing devices to compute the communication success probability of each frequency for activated secondary user terminals 110 in the network. The successful communication probabilities of secondary user terminals 110 can be computed more accurately when spectrum sensing information is obtained from the positions of the secondary user terminal, but since spectrum sensing is an operation that consumes a considerable amount of power, it is difficult to perform such sensing at a terminal, especially for an IoT terminal which operates at a low power.

The control device 130 may receive the position information of the secondary user terminal from each secondary user terminal 110 and may use the information regarding the reception power (amount of interference) for each frequency received from the spectrum sensing devices and the position information obtained from each secondary user terminal to compute the communication success probability of each frequency for each secondary user terminal. Computing the communication success probability for a particular frequency at the position of a particular secondary user terminal can be performed using any of a variety of known methods. For instance, the communication success probability for a particular frequency can be computed based on the method disclosed in Korean Registered Patent No. 10-1806065.

The communication success probability of each secondary user terminal computed by the control device 130 may be used as basic information for the learning.

Figure 2:
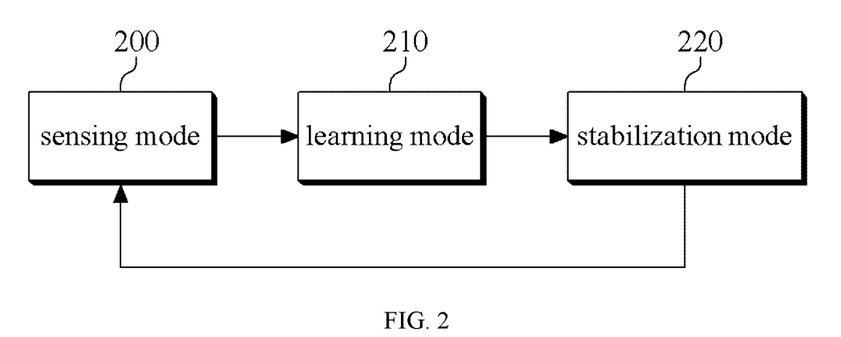
FIG. 2 is a block diagram illustrating the overall flow in selecting a terminal suitable for cognitive radio communication at a control device according to an embodiment of the present invention.

FIG. 2 is a block diagram illustrating the overall flow in selecting a terminal suitable for cognitive radio communication at a control device according to an embodiment of the present invention.

Referring to FIG. 2, the control device may initially operate under a sensing mode 200. In the sensing mode, the reception power (amount of interference) for each frequency may be received from the multiple number of spectrum sensing devices distributed over different places. The control device may aggregate and store the amount of interference for each frequency band received from the multiple spectrum sensing devices in the sensing mode.

Also, in the sensing mode, the control device may receive position information from activated secondary user terminals within the network.

When the sensing mode is completed, the control device may operate under a learning mode 210. The control device may perform iterative reinforced learning in the learning mode and may determine an access probability for each secondary user terminal according to the learning. The learning mode can be performed until the access probability for each secondary user terminal according to learning is converged.

When the learning mode is completed, a stabilization mode 220 may be operated. In the stabilization mode, there may be no particular learning performed, and this stabilization mode may be maintained until a considerable change (a change greater than or equal to a preset threshold) occurs in the amount of interference for each frequency within the network. When a considerable change occurs in the amount of interference for each frequency within the network, the control device may again switch to the sensing mode.

Figure 3:
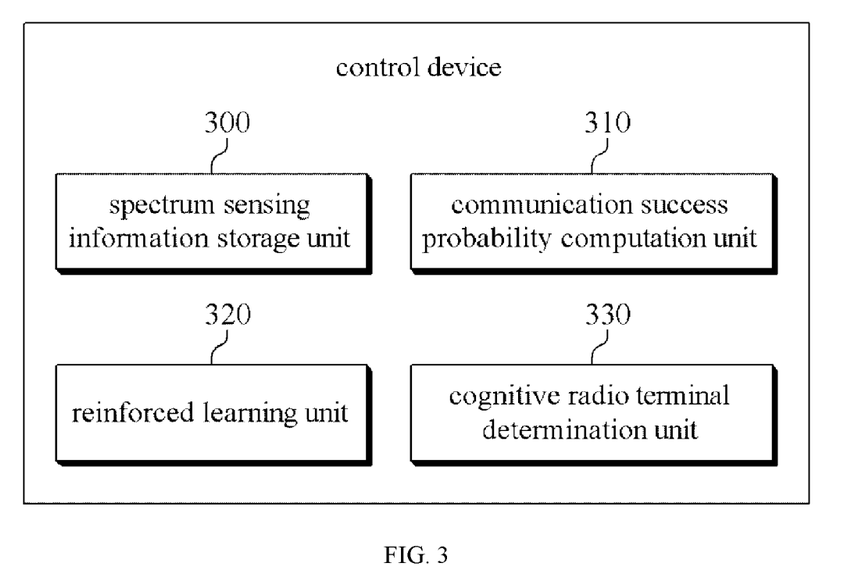
FIG. 3 is a block diagram illustrating the composition of a control device according to an embodiment of the present invention.

FIG. 3 is a block diagram illustrating the composition of a control device according to an embodiment of the present invention.

Referring to FIG. 3, a control device according to an embodiment of the present invention may include a spectrum sensing information storage unit 300, a communication success probability computation unit 310, a reinforced learning unit 320, and a cognitive radio terminal determination unit 330.

The spectrum sensing information storage unit 300 may store the spectrum sensing information provided from the multiple spectrum sensing devices. As described above, the spectrum sensing information may be the reception power (amount of interference) for each frequency.

The communication success probability computation unit 310 may compute the communication success probability of each frequency for each secondary user terminal by using the position information of activated secondary user terminals within the network and the reception power for each frequency.

The reinforced learning unit 320 may finally determine the access probability of each secondary user terminal through learning. The reinforced learning for the present invention may be performed iteratively, incorporating changes in the utility function, which represents the overall network performance in the current iteration and previous iterations.

Figure 4:
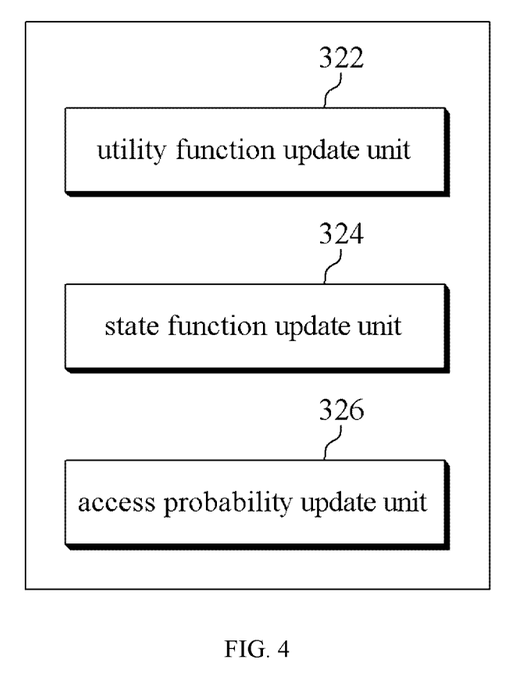
FIG. 4 is a block diagram illustrating the detailed composition of a reinforced learning unit according to an embodiment of the present invention.

FIG. 4 is a block diagram illustrating the detailed composition of a reinforced learning unit according to an embodiment of the present invention.

Referring to FIG. 4, a reinforced learning unit 320 according to an embodiment of the present invention may include a utility function update unit 322, a state function update unit 324, and an access probability update unit 326.

The present invention may continuously update the utility function, state function, and access probabilities for reinforced learning. The reinforced learning for the present invention may be performed iteratively, and the access probability for each secondary user terminal may be updated at each iteration.

For convenience, this embodiment will be described with respect to reinforced learning at a particular frequency band, and the reinforced learning described for the embodiment can be performed for each of the frequency bands.

The utility function value and state function value at each iteration may be used as variables for updating the access probability for each secondary user terminal.

The access probability at the initial state may be set as the communication success probability for each secondary user terminal computed by the control device.

In the first iteration, each secondary user terminal 110 may attempt communication with a receiver terminal based on the initial access probability (communication success probability). Here, the attempting communication based on the initial access probability (communication success probability) means that communication with the receiver terminal may or may not be performed depending on the initial access probability. For example, if the initial access probability of a particular secondary user terminal is 0.8, it may attempt communication with a receiver terminal with a probability of 0.8 and may not attempt communication with a probability of 0.2. In the learning mode, the signal that the secondary user terminal transmits to a receiver terminal may be a preconfigured pilot signal.

The secondary user terminals that have attempted communication according to the initial access probability may receive feedback from the receiver terminals as information regarding whether or not decoding was successful. A receiver terminal would not succeed in decoding if the amount of interference is great and would succeed in decoding if the amount of interference is not great.

Each secondary user terminal may transmit information to the control device 130 regarding whether or not communication with a receiver terminal was performed and whether or not decoding was successful as a result of the attempt.

In the second iteration, the utility function, state function, and access probabilities may be updated based on the information transmitted by each secondary user terminal regarding whether or not communication was performed and whether or not decoding was successful.

When the access probabilities are updated, then in the next iteration, each secondary user terminal may attempt communication with a receiver terminal based on the updated access probability and, in the same manner as for the first iteration, may receive feedback from the receiver terminal as regards whether or not decoding was successful as a result of the communication attempt.

A more detailed description of the utility function, state function, and access probabilities updated at each iteration is provided below.

The utility function updated by the utility function update unit 324 may be defined as Equation 1 below.

$$u(t) = \log_2(1+\beta) \times N_d \qquad \text{[Equation 1]}$$

In Equation 1 above, u(t) represents the utility function, t represents the iteration number, $\beta$ represents the minimum required SINR, and Nd represents the number of terminals that have succeeded in decoding.

Thus, the utility function value at a particular iteration may be based on the number of terminals that have succeeded in decoding at the particular iteration. The utility function value may used when updating the state function.

$$p_k(t) = (1+\exp(w_k(t) \cdot (-1)^{a_k(t)})^{-1} \qquad \text{[Equation 2]}$$

The access probabilities may be defined as Equation 2 below.

As described above, $p_k(0)$ is the communication success probability calculated initially for each secondary user terminal, and Equation 2 above may be applied starting from the second iteration where t=1.

In Equation 2 above, k is an index for the secondary user terminal, $a_k(t)$ is a value indicating whether or not secondary user terminal k performed communication in the t-th iteration, and $w_k(t)$ represents the state function value of secondary user terminal k in the t-th iteration.

$a_k(t)$ may be set to 1 if the secondary user terminal k performed communication in the t-th iteration and may be set to 0 if the secondary user terminal k did not perform communication in the t-th iteration.

The state function may be configured as Equation 3 below.

$$w_k(t+1) = w_k(t) + \alpha(t)\{u(t) - \bar{u}(t-1)\} \cdot G(t) \quad \text{[Equation 3]}$$

In Equation 3 above, $w_k(t)$ represents the state function value of secondary user terminal k in the t-th iteration.

In Equation 3 above, $\alpha(t)$ may be defined as Equation 4 below.

$$\alpha(t+1) = \alpha(t) - \Delta.$$

In Equation 4 above, $\Delta$ may be a preconfigured constant. Also, G(t) may be defined as Equation 5 below.

$$G(t) = \frac{\partial}{\partial w_k(t)}\ln\{p_k(t)\} = \frac{(-1)^{a_k(t)+1}}{1 + \exp(w_k(t) \cdot (-1)^{a_k(t)+1})}, \quad \text{[Equation 5]}$$

Also, $\bar{u}(t)$ may be defined as Equation 6 below.

$$\bar{u}(t) = (1-\lambda) \times \bar{u}(t-1) + \lambda u(t), \quad 0 < \lambda \leq 1, \quad \text{[Equation 6]}$$

In Equation 6 above, $\lambda$ is an arbitrary constant that is determined from 0 to 1 and serves as a sort of weight constant.

Referring to Equation 3, the state function value at a particular iteration may be set based on the state value at the previous iteration and the change in utility function value between the previous iteration and the iteration before (u(t)−$\bar{u}$(t−1)). The change in utility function value represents the change in the number of secondary user terminals that have succeeded in decoding, where an increase in the number of secondary user terminals that have succeeded in decoding may operate as a + compensation, while a decrease in the number of secondary user terminals that have succeeded in decoding may operate as a − compensation. Ultimately, the change in utility function value (u(t)−$\bar{u}$(t−1)) may serve as compensation information for the reinforced learning.

$\alpha(t)$ may be multiplied to the change in utility function value, and as can be seen from Equation 4, $\alpha(t)$ may be configured to decrease with each increasing iteration.

Figure 5:
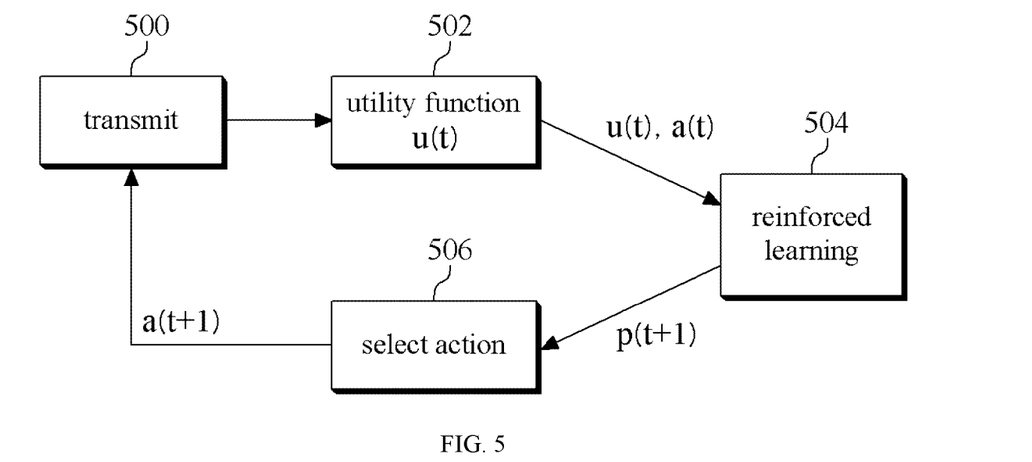
FIG. 5 illustrates the framework for a reinforced learning process according to an embodiment of the present invention.

Referring to FIG. 5, at each iteration, each secondary user terminal may attempt communication based on the access probability, receive feedback from the receiver terminal as information regarding whether or not decoding was successful, and transmit information on whether or not communication was performed ($\alpha_k(t)$) and whether or not decoding was successful (operation 500).

Using the information regarding whether or not decoding was successful transmitted by each secondary user terminal, the utility function value may be updated (operation 502).

Based on the updated utility function value and the information on whether or not communication was performed ($\alpha_k(t)$), reinforced learning may be performed (operation 504), which entails updating the state function and the access probabilities.

When the access probabilities are updated, each secondary user terminal may perform an action of transmitting a pilot signal to the receiver terminal based on the new access probability (operation 506).

After transmitting a pilot signal and receiving information from the receiver terminal regarding whether or not decoding was successful and whether or not communication was performed, the secondary user terminal may repeat the procedure of transmitting the information regarding whether or not decoding was successful and information regarding whether or not communication was performed for the next iteration (operation 500).

With the present invention, learning may proceed as each secondary user terminal attempts communication with a receiver terminal based on an access probability and the state function and access probabilities are updated based on the number of terminals for which decoding was successful and information regarding whether or not communication was performed. For example, if a particular terminal attempted communication at a particular iteration and decoding was successful, and the improvement in overall network performance (u(t)−$\bar{u}$(t−1)) was "+", then the access probability of the corresponding secondary user terminal would be increased.

As the iterations are continued, the access probabilities would converge, and an access probability computation formula may be configured such that the access probabilities approach 1 or 0 as they converge. Referring to Equation 2, it can be seen that an e function may be used so that the access probabilities converge to 1 or 0.

The cognitive radio terminal determination unit 330 may determine the secondary user terminals that are to perform cognitive radio communication, based on the access probabilities determined by the learning. For instance, the secondary user terminals having access probabilities greater than or equal to a preset threshold can be determined as the terminals that will perform cognitive radio communication.

Figure 6:
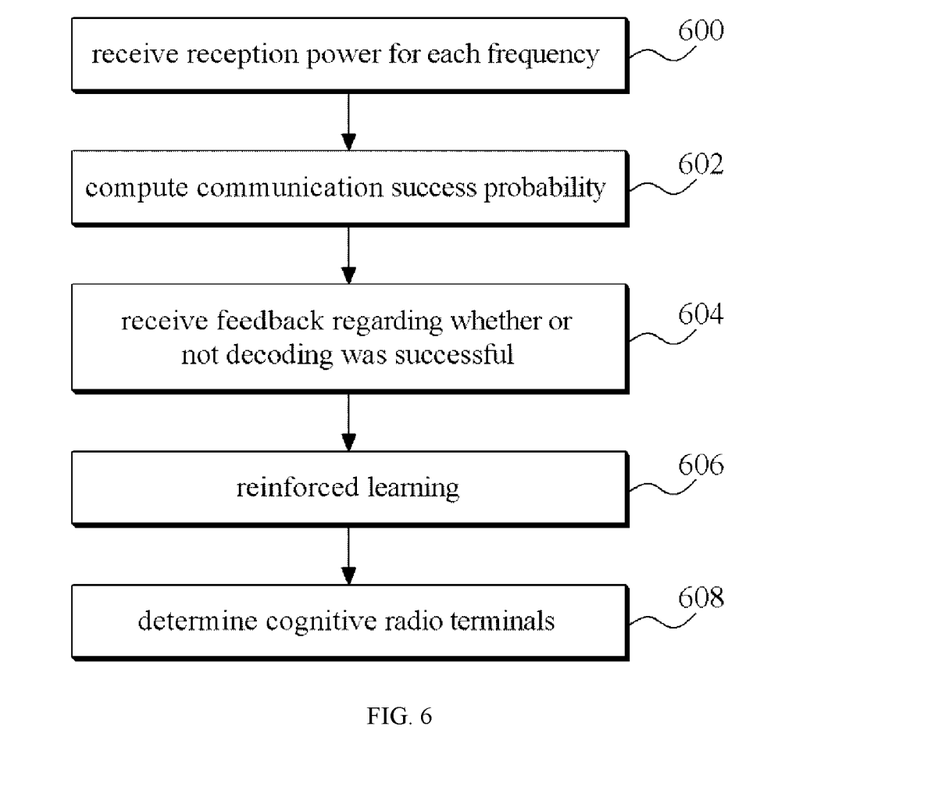
FIG. 6 is a flowchart illustrating the overall flow of a method for selecting a cognitive radio terminal according to an embodiment of the present invention.

FIG. 6 is a flowchart illustrating the overall flow of a method for selecting a cognitive radio terminal according to an embodiment of the present invention.

First, the reception power (amount of interference) for each frequency may be received from multiple spectrum sensing devices (operation 600).

Position information may be received from activated terminals within the network, and the communication success probability of each activated terminal may be computed (operation 602). The computed communication success probabilities may be used as the initial access probabilities in the learning process.

When the communication success probabilities are computed, each activated terminal within the network may attempt cognitive radio communication with the initial access probability (communication success probability) and may receive feedback from the terminal as information regarding whether or not communication was performed and whether or not decoding was successful (operation 604).

Based on the feedback information, reinforced learning may be performed (operation 606), which may entail updating the utility function, state function, and access probabilities. The reinforced learning may be performed until the access probability for each terminal converges.

When the reinforced learning is completed, the terminals that are to perform cognitive radio communication may be determined based on the final access probability of each terminal (operation 608). The terminals having access probabilities greater than or equal to a preset threshold may be selected.

The embodiments and examples set forth above are presented merely to allow an easier understanding of the present invention and do not limit the scope of the invention in any way. It should be understood that numerous embodiments conceived as variations of the above are encompassed within the scope of the invention. For example, each of the elements illustrated with reference to an embodiment of the invention can be implemented in a distributed form, and conversely elements described as being separate from one another can be implemented in an integrated form. The technical scope of protection of the present invention is to be defined by the technical spirit set forth in the scope of claims, where the technical scope of protection of the present invention is not limited only to the literal disclosure of the claims but rather encompasses the scope of technological equivalents.

What is claimed is:

1. A control device for determining cognitive radio terminals, the control device comprising:
   a spectrum sensing information storage unit configured to receive interference amount information for each frequency from a plurality of spectrum sensing devices and store the received interference amount information;
   a communication success probability computation unit configured to receive position information from a plurality of secondary user terminals within a network and compute a communication success probability of each secondary user terminal;
   a reinforced learning unit configured to perform learning by setting the communication success probability as an initial access probability for each of the secondary user terminals and updating an access probability for each of the secondary user terminals, a state function, and a utility function at each iteration; and
   a cognitive radio terminal determination unit configured to select a secondary user terminal that is to perform cognitive radio communication based on a final access probability for each of the secondary user terminals when the learning is completed at the reinforced learning unit,
   wherein the reinforced learning unit at each iteration receives information regarding whether or not communication was performed and information regarding whether or not decoding was successful provided by the secondary user terminals as feedback after attempting cognitive radio communication based on the access probabilities, updates the utility function representing network performance based on a number of terminals that have succeeded in decoding in each iteration, updates the state function for each of the secondary user terminals by using the utility function and the information regarding whether or not communication was performed, and updates the access probabilities by using the state function and the information regarding whether or not communication was performed.

2. The control device for determining cognitive radio terminals according to claim 1, wherein the state function has a value for a subsequent iteration determined based on a difference between a utility function value for a current iteration and a utility function value for a previous iteration.

3. The control device for determining cognitive radio terminals according to claim 1, wherein an initial value of the state function is determined by using the communication success probability.

4. The control device for determining cognitive radio terminals according to claim 1, wherein a formula for determining the access probabilities is configured such that an increase in iterations of the reinforced learning unit causes the access probability for each of the secondary user terminals to approach 1 or 0.

5. The control device for determining cognitive radio terminals according to claim 1, wherein the utility function is updated at each iteration (t) according to an equation shown below:

$$u(t) = \log_2(1+\beta) \times N_d$$

where $\beta$ is a minimum required SINK, and $N_d$ is a number of terminals that have succeeded in decoding.

6. The control device for determining cognitive radio terminals according to claim 5, wherein the state function is updated at each iteration (t) according to an equation shown below:

$$w_k(t+1) = w_k(t) + \alpha(t)\{u(t) - \bar{u}(t+1)\} \cdot G(t)$$

$$\alpha(t+1) = \alpha(t) - \Delta.$$

$$G(t) = \frac{\partial}{\partial w_k(t)} \ln\{p_k(t)\} = \frac{(-1)^{a_k(t)+1}}{1+\exp(w_k(t) \cdot (-1)^{a_k(t)+1})},$$

$$\bar{u}(t) = (1-\lambda) \cdot \bar{u}(t-1) + \lambda u(t), 0 < \lambda \leq 1,$$

where k is an index for the secondary user terminal, $\Delta$ is an arbitrary constant, $p_k(t)$ is the access probability, $u(t)$ is the utility function, $\lambda$ is an arbitrary weight constant, $a_k(t)$ is information indicating whether or not communication was performed in a current iteration and is set to 1 if communication was performed and 0 if communication was not performed.

7. The control device for determining cognitive radio terminals according to claim 6, wherein the access probability $p_k(t)$ is updated at each iteration (t) according to an equation shown below:

$$p_k(t) = 1 + \exp(w_k(t) \cdot (-1^{(60\ k(t))})^{-1}$$

8. The control device for determining cognitive radio terminals according to claim 1, wherein the cognitive radio terminal determination unit determines secondary user terminals having final access probabilities greater than or equal to a preset threshold as the terminals that are to perform cognitive radio communication.

9. A cognitive radio terminal determining method comprising:
   (a) receiving interference amount information for each frequency from a plurality of spectrum sensing devices and storing the received interference amount information;
   (b) receiving position information from a plurality of secondary user terminals within a network and computing a communication success probability of each secondary user terminal;
   (c) performing learning by setting the communication success probability as an initial access probability for each of the secondary user terminals and updating an access probability for each of the secondary user terminals, a state function, and a utility function at each iteration; and
   (d) selecting a secondary user terminal that is to perform cognitive radio communication based on a final access probability for each of the secondary user terminals when the learning is completed at said step (c),
   wherein said step (c) comprises, at each iteration, receiving information regarding whether or not communication was performed and information regarding whether or not decoding was successful provided by the secondary user terminals as feedback after attempting cognitive radio communication based on the access probabilities, updating the utility function representing network performance based on a number of terminals that have succeeded in decoding in each iteration, updating the state function for each of the secondary user terminals by using the utility function and the information regarding whether or not communication was performed, and updating the access probabilities by using the state function and the information regarding whether or not communication was performed.

10. The cognitive radio terminal determining method of claim 9, wherein the state function has a value for a subsequent iteration determined based on a difference between a utility function value for a current iteration and a utility function value for a previous iteration.

11. The cognitive radio terminal determining method of claim 9, wherein an initial value of the state function is determined by using the communication success probability.

12. The cognitive radio terminal determining method of claim 9, wherein a formula for determining the access probabilities is configured such that an increase in iterations of the reinforced learning unit causes the access probability for each of the secondary user terminals to approach 1 or 0.

13. The cognitive radio terminal determining method of claim 9, wherein the utility function is updated at each iteration (t) according to an equation shown below:

$$u(t) = \log_2(1+\beta) \times N_d$$

where $\beta$ is a minimum required SINR, and $N_d$ is a number of terminals that have succeeded in decoding.

14. The cognitive radio terminal determining method of claim 13, wherein the state function is updated at each iteration (t) according to an equation shown below:

$$w_k(t+1) = w_k(t) + \alpha(t)\{u(t) - \overline{u}(t+1)\} \cdot G(t)$$

$$\alpha(t+1) = \alpha(t) - \Delta.$$

$$G(t) = \frac{\partial}{\partial w_k(t)} \ln\{p_k(t)\} = \frac{(-1)^{a_k(t)+1}}{1+\exp(w_k(t) \cdot (-1)^{a_k(t)+1})},$$

$$\overline{u}(t) = (1-\lambda) \cdot \overline{u}(t-1) + \lambda u(t), 0 < \lambda \leq 1,$$

where k is an index for the secondary user terminal, $\Delta$ is an arbitrary constant, $p_k(t)$ is the access probability, u(t) is the utility function, $\lambda$ is an arbitrary weight constant, $a_k(t)$ is information indicating whether or not communication was performed in a current iteration and is set to 1 if communication was performed and 0 if communication was not performed.

15. The cognitive radio terminal determining method of claim 14, wherein the access probability $p_k(t)$ is updated at each iteration (t) according to an equation shown below:

$$p_k(t) = (1+\exp(w_k(t) \cdot (-1)^{a_k(t)}))^{-1}$$

16. The cognitive radio terminal determining method of claim 9, wherein said step (d) comprises determining secondary user terminals having final access probabilities greater than or equal to a preset threshold as the terminals that are to perform cognitive radio communication.

* * * * *